US011549813B2

(12) United States Patent
Lindemann et al.

(10) Patent No.: US 11,549,813 B2
(45) Date of Patent: Jan. 10, 2023

(54) METHOD AND APPARATUS FOR TRANSMITTING ROUTE DATA CAPTURED BY A TRAVELLING VEHICLE TO A CENTRAL DATABASE WHILE BETTER PROTECTING PRIVACY

(71) Applicant: Continental Automotive GmbH, Hannvoer (DE)

(72) Inventors: Robert Lindemann, Wiesbaden (DE); Hueseyin Daglioglu, Steinbach (DE)

(73) Assignee: Continental Automotive GmbH, Hannover (DE)

( * ) Notice: Subject to any disclaimer, the term of this patent is extended or adjusted under 35 U.S.C. 154(b) by 214 days.

(21) Appl. No.: 16/300,417

(22) PCT Filed: May 9, 2017

(86) PCT No.: PCT/EP2017/061044
§ 371 (c)(1),
(2) Date: Nov. 9, 2018

(87) PCT Pub. No.: WO2017/194533
PCT Pub. Date: Nov. 16, 2017

(65) Prior Publication Data
US 2019/0226849 A1     Jul. 25, 2019

(30) Foreign Application Priority Data
May 10, 2016    (DE) ...................... 10 2016 207 984.0

(51) Int. Cl.
*G01C 21/14*     (2006.01)
*G01C 21/32*     (2006.01)
(Continued)

(52) U.S. Cl.
CPC ............. *G01C 21/14* (2013.01); *G01C 21/32* (2013.01); *G06F 16/29* (2019.01); *G07C 5/008* (2013.01)

(58) Field of Classification Search
None
See application file for complete search history.

(56) References Cited

U.S. PATENT DOCUMENTS 6,720,920 B2 *   4/2004   Breed ................. B60N 2/2863
                                                                342/357.31
8,825,404 B2 *   9/2014   Mays ................. G06Q 30/0251
                                                                 701/428
(Continued)

FOREIGN PATENT DOCUMENTS

DE    10044889 A1    4/2002
DE    69823462 T2    4/2005
(Continued)

OTHER PUBLICATIONS

"IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.11-2016 (Revision of IEEE Std 802.11-2012).*

(Continued)

*Primary Examiner* — Russell Frejd

(57) ABSTRACT

Transmitting route data captured by a traveling vehicle to a remote database includes capturing route data records having route data and a location and time of capture. The captured route data records are stored in a memory of the vehicle and are sent to the database. A route data message is sent at a time randomly selected within a first time interval after the capture of the route data and/or when the vehicle has left a predetermined radius around the location of (Continued)

capture of the route data. The messages can be sent directly to the database, or via a minimum number of intermediate receivers posing as the origin of the data to the respective receiver of a transmission from them.

11 Claims, 4 Drawing Sheets

(51) Int. Cl.
*G06F 16/29* (2019.01)
*G07C 5/00* (2006.01)

(56) References Cited

U.S. PATENT DOCUMENTS

| | | | |
|---|---|---|---|
| 9,894,325 B2* | 2/2018 | Rauscher | H04N 7/181 |
| 2006/0265125 A1* | 11/2006 | Glaza | G01C 21/34 |
| | | | 701/210 |
| 2012/0283944 A1* | 11/2012 | Haavasoja | G08G 1/096791 |
| | | | 701/411 |
| 2016/0171521 A1* | 6/2016 | Ramirez | G06Q 10/0635 |
| | | | 701/409 |
| 2016/0379486 A1* | 12/2016 | Taylor | G08G 1/096844 |
| | | | 340/905 |
| 2017/0346637 A1* | 11/2017 | Zhang | H04L 9/0643 |
| 2020/0021977 A1* | 1/2020 | Zaman | H04W 12/0401 |

FOREIGN PATENT DOCUMENTS

| | | |
|---|---|---|
| DE | 102007042877 A1 | 3/2009 |
| DE | 102009055417 A1 | 9/2010 |
| DE | 102011077952 A1 | 12/2012 |
| WO | 2011/067472 A1 | 6/2011 |

OTHER PUBLICATIONS

"IEEE Standard for Information technology—Telecommunications and information exchange between systems Local and metropolitan area networks—Specific requirements Part 11: Wireless LAN Medium Access Control (MAC) and Physical Layer (PHY) Specifications," in IEEE Std 802.11-2012 (Revision of IEEE Std 802.11-2007).*
https://www.mathworks.com/help/wlan/ug/802-11-mac-frame-decoding.html, 802.11 MAC Fram Decoding (Year: 2021).*
International Search Report and Written Opinion dated Jul. 27, 2017 from corresponding International Patent Application No. PCT/EP2017/061044.
Office Action dated Feb. 2, 2017 from corresponding German Patent Application No. 10 2016 207 984.0.

* cited by examiner

METHOD AND APPARATUS FOR TRANSMITTING ROUTE DATA CAPTURED BY A TRAVELLING VEHICLE TO A CENTRAL DATABASE WHILE BETTER PROTECTING PRIVACY

BACKGROUND

Field of the Art

The present invention relates to the capture of route data by sensors of a vehicle and transmission of the captured route data to a vehicle-external database.

Prior Art

In order to keep data pertaining to route properties in a database, for example for autonomous or semiautonomous driving, relevant, the data need to be regularly brought up to date. Capture of the route properties can be performed by vehicles traveling on the roads that are each equipped with suitable sensors and an apparatus for capturing the geo-position. The captured data can then be sent via a vehicle-to-X communication or a mobile radio connection to a database, where they are consolidated to produce a data record that can then be sent to other vehicles, e.g. for a route calculation or the like.

Many vehicle users have reservations that capture of the position during the journey can be used to create a profile, and are therefore not available for the capture of data.

BRIEF SUMMARY

It is an object to improve the privacy of vehicle users when forwarding route properties captured during the journey to a central database.

This object is achieved by the method specified in claim 1. Advantageous refinements and further developments of the method are specified in the dependent claims.

EXPLANATIONS OF TERMS

Within the context of the present description, the term route data relates to data describing properties of a route at a location at the time of capture. Properties of a route comprise, inter alia, a gradient, a lateral incline, or a surface condition of a road on the route, e.g. roughness of the road surface or ruts, or else traffic restrictions indicated by road signs, times at which traffic restrictions indicated by road signs apply, the site of a road sign, temporary or longer-lasting traffic disruptions, e.g. as a result of accidents or broken down vehicles or shed loads, a traffic density, and the like. A location, or capture location, at which a route property has been captured may be a geo-position, as used in navigation systems, or a position on a map used by a navigation system, or the like, for example. A route data record is accordingly a data record combining at least one route property and the associated location of capture. The term route data messages relates to data messages sent to a vehicle-external database. They comprise route data and a location at which the route data have been captured, inter alia. The location of capture may also be a route section determined by geo-positions for a start and an end, or by an intermediate geo-position and an extent in both directions of travel on the route. The location of capture can also include a direction of travel on the route section, e.g. in order to more accurately capture a route property available only for one direction of travel.

According to one aspect of the method according to the invention, route data and associated locations are captured by a traveling vehicle, and are stored together with a time of capture in a memory of the vehicle. The route data in this context can be captured by one or more sensors provided on or in the vehicle. The storage can be effected in a separate, secure or encrypted area of the memory.

For the purpose of capturing route data according to this and other aspects of the present invention, sensors that can also be used for other functions are provided in the vehicle. As such, by way of example, a camera for road sign recognition or for a lane departure warning system, a distance radar, a lidar system for automated driving, a rain sensor or a temperature sensor, which are provided in the vehicle anyway, can also be used for capturing route properties. The temperature sensor in this context would provide, by way of example, route properties having a shorter validity period, such as, for example, temperatures close to the road surface, which are evaluated to warn about icy roads for sections of the route. Sensors providing information about dynamic movements of the wheel suspensions, for example for a dynamically controlled chassis, can provide data pertaining to the condition of the surface, e.g. bumps or ruts. Data from ABS systems and traction control systems can also provide information about properties of the route surface, e.g. about a coefficient of friction, which may be different depending on weather conditions. Weather conditions can be captured by a rain sensor, for example, or by monitoring the operation of a windshield wiper by a driver. Gyrosensors or acceleration sensors of a vehicle stabilization system can provide information pertaining to gradient or lateral incline of the route. Specific sensors can be additionally provided for capturing other route properties.

Route data messages comprising route data and a respectively associated location of capture are sent to the database after the vehicle has left a predetermined radius around the capture location, i.e. there is a particular distance between the vehicle and the capture location, and/or at a randomly chosen time interval within a predetermined time interval after the time of capture. The predetermined time interval and/or the predetermined radius may be user-defined, e.g. as a result of selection of one of multiple values of a parameter that represent different grades of the protection of privacy by a user. The predetermined time interval can begin immediately upon or after the capture, but it is also possible to have the predetermined time interval begin only after a waiting time has elapsed after the capture, or after the predetermined radius around the capture location has been left. It is also possible to determine, in addition to the predetermined radius indicating an absolute distance from the capture location, another radius, from which, when it is left, the predetermined time interval begins. The messages are thus not necessarily sent immediately after the predetermined radius is left.

The predetermined period can also be adapted dynamically on the basis of a distance covered since the time of capture, and the predetermined radius can be dynamically adapted on the basis of an average speed around the time of capture. The predetermined radius can also be stipulated on the basis of a minimum number of road junctions within the radius, which hampers ascertainment of a probable itinerary.

When the vehicle follows a route planned by means of a navigation system, the predetermined period and/or the radius may also be dependent on the length of the route, and/or on an average speed ascertained before capture.

In the case of one aspect of the method according to the invention, if the predetermined radius is chosen to be relatively large, for example comprises a larger part of a city, and is possibly not left, the route data captured during a journey can be transmitted after the journey has ended. Such a situation can arise, by way of example, when a relatively large radius around a home location from which journeys are begun frequently or regularly is rarely left. To nevertheless hamper the reconstruction of a route traveled during a journey, the route data messages can be sent in succession within a time interval after the journey has ended. In this case, the individual route data messages can be sent in a random order, independent of the chronological order of their capture, and also at random intervals from one another.

If the type of route data allows a reconstruction of the direction of travel and, as a result, a reconstruction of a single journey, for example road signs, the content of which can usually be seen only from one side, then sending can be delayed until a minimum number of further journeys have been made. It is also conceivable for further journeys applicable to the present method to be only those for which at least a subsection differs from previously traveled itineraries. In this case, repeatedly captured route properties that have not changed over the multiple journeys can be sent only a single time. Alternatively, there may be provision for route data facilitating a reconstruction of the itinerary not to be transmitted.

Fundamentally, when multiple route data records for which respective conditions for sending to the database are satisfied are stored in the vehicle, a first order for sending the applicable route data messages can be chosen for different aspects of the present method. The first order may be a random order independent of the chronological order of capture. This can hamper the ascertainment of a direction of travel in which the journey has been made. In this case, random intervals of time can be inserted between individual route data messages. It is naturally also possible to send the data in the order in which they are captured.

According to one aspect of the method according to the invention, the route data to be transmitted to the database can be selected such that only data pertaining to chronologically invariable or only slowly variable route properties are transmitted, in order to hamper the ascertainment of a driving profile by means of a correlation with applicable data from other vehicles.

According to one aspect of the method according to the invention, a period within which the route data have been captured is also transmitted in a route data message. As a result, a decision can be made in the database regarding whether the received data are rejected or stored. This aspect may be useful when different settings for protecting privacy in different vehicles lead to route data for a location that relate to relatively quickly variable route properties arriving at the database in a manner distributed over a longer period. The route data captured during an earlier period, that is to say older route data, which differ from newer route data, captured during a later period, can then be rejected. The period can be chosen such that ascertainment of an itinerary is hampered. As such, by way of example, the period may be chosen such that it comprises multiple successive single journeys.

According to one aspect of the method according to the invention, the predetermined radius and/or the predetermined time interval are dependent on the urgency of the transmission of the data. As such, for data relating to route properties whose fast transmission and further dissemination may be of benefit to other road users, e.g. slipperiness, broken down vehicles, congestion and the like, smaller radii and shorter time intervals can be used than for data relating to substantially invariable or only slowly variable route properties, such as e.g. ruts, potholes, roadworks and the like. Normally, such route data relate to both directions of travel on a route or are capturable independently of a direction of travel, as a result of which a direction of travel is not reconstructable by that means.

According to one aspect of the method according to the invention, route properties remaining substantially unaltered over a route section can be transmitted as a mean value for the section. Accordingly, the start and end of the section are transmitted instead of a single capture location. The center of the radius for delaying the transmission can be chosen at random within the section in this case. Alternatively, it is possible to place the radius at the end of the section as seen in the direction of travel. The start and end of the section may be determined by the substantially unaltered property. Alternatively, it is possible to divide a longer section having substantially unaltered route properties into subsections for which a respective route data message of their own is transmitted. These messages can then again be transmitted to the database, according to one or more of the aspects described earlier on, in an order chronologically independent of the capture and possibly at random intervals.

According to one aspect of the method according to the invention, the data are transmitted in a user data area of a message that also has a header area as well. The message can contain a signature of the sending vehicle. The signature may be specific to a vehicle manufacturer, or to a vehicle series of a manufacturer, but also to a single vehicle. As a result, it is e.g. possible to make a quality distinction for the data, e.g. if different sensors having different accuracy are used for capturing the route properties in vehicles or vehicle series of different manufacturers.

The signature can be inspected on reception in the database. If a signature is repeatedly associated with erroneous data, further data having this signature can be rejected immediately on reception. If the signature is transmitted in the header area and intermediate receivers replace it with their own respective signature, this option is lost. In this case, an at least partial remedy can be provided if a further signature that does not allow explicit identification of a single vehicle, e.g, a signature common to all vehicles in a series from one manufacturer, is inserted into the user data portion of the message. In the event of a sensor problem specific to one series, the applicable messages can be filtered more easily.

According to one aspect of the method according to the invention, the data in the user data area of the message are encrypted using a public key of the database, which means that they can be decrypted only in the database using the applicable private key. As a result, unauthorized access to the data during the transmission, at least some of which is effected via a wireless transmission link, of course, can be hampered. It is also possible to encrypt data according to vehicle manufacturer, which means that only the manufacturer of the vehicle that has originally captured the data is capable of decrypting the data. This allows service differentiation between different manufacturers in the database. Forwarding of the route data messages in this context can be performed independently of the manufacturer by all vehicles set up to do so.

According to one aspect of the method according to the invention, data are not sent directly to the database, but rather need to be forwarded via a predetermined minimum number of other vehicles before they are sent to the database. The data can be transmitted between two vehicles by means of vehicle-to-vehicle communication (V2V), also known as car-to-car communication (C2C). Each intermediate receiver in this context poses as the origin of the data to the receiver of the route data message transmitted by it.

In this case, it may make sense, for example in order to limit the data traffic, but also in order to avoid an accumulation of identical route data in the database that have been captured by one vehicle but have been sent by different vehicles, for captured route data to be sent by the capturing vehicle only a single time. Expediently, on transmission, correct reception is verified, for example by means of known methods for forward error correction, and acknowledged. After an acknowledgement of reception is obtained, the data cannot be sent again, and can be erased if they do not need to remain stored in the vehicle for other purposes.

The header portion of the message may have a flag denoting the message as original provided in it that cannot be transmitted directly to the database. A vehicle acting as an intermediate receiver can erase the flag after reception or before forwarding, and can then send the message to the database. Instead of the flag, a count may also be provided in the header portion of the message, which the vehicle that has captured the data sets to a value and which is lowered by one by each intermediate receiver. So long as the count for a message is not zero, this message cannot be sent directly to the database. The count accordingly indicates how often a message needs to be forwarded before it can be sent to the database.

This aspect of the method according to the invention ensures, in particular if the first sending of the message has been delayed according to one or more other aspects of the method according to the invention, that reception of a message from a vehicle cannot be used to infer that this vehicle has also been at the location of capture of the route data. If only one intermediate receiver is provided, it is merely possible to conclude that the vehicle that has captured the data and the vehicle that has sent the data to the database have encountered one another at some location. If multiple intermediate receivers are provided, then not even this inference is possible. However, it is fundamentally possible to send captured route data to an intermediate receiver immediately after capture.

The count prescribed by the vehicle that has captured the data may be adjustable by a user, either directly or via a general 'privacy setting' that also influences other data and/or transmissions.

The count can also be chosen at random or automatically according to traffic density and according to the urgency of forwarding to the central server. When traffic density is high, more potential intermediate receivers are present, which means that a higher count can be set without significantly increasing the delay between capture of the data and reception of the data in the database. Instead of a count, it is fundamentally also possible for an absolute earliest and/or latest transmission time for forwarding to the database to be specified. If data are available that have a high level of urgency, that is to say need to be transmitted to the database as quickly as possible, the count can be automatically decreased.

According to one aspect of the method according to the invention, only one data record is ever sent to the same intermediate receiver. If there are multiple data records in the memory of the vehicle that has captured the data, that is to say of the original source, and the conditions for sending are satisfied for multiple data records, it is furthermore possible for the data record that is to be sent to be selected at random if an order of sending is not prescribed on the basis of an urgency sorting or for other reasons. In other words, an intermediate receiver can only ever receive one set of data from a particular vehicle, but can receive multiple sets of data from multiple vehicles. A vehicle that has ever served as an intermediate receiver for another vehicle cannot then serve as an intermediate receiver for messages from this vehicle again before a waiting time has elapsed or within a radius around the location of reception of the first message. The waiting time may be adjustable by a user, or may be dependent on the urgency of the transmission of the message. Since the vehicles identify themselves on connection setup, transmission of multiple messages having route properties to the same vehicle within the time-out period can be prevented in a simple manner.

The above aspect can also be implemented by virtue of a transmission being effected only to vehicles that are traveling in a different direction than the sending vehicle. The direction of travel can be transmitted on connection setup, for example as a numerical value representing a compass bearing or as a statement indicating a point of the compass. When there is visual contact between vehicles, e.g. within towns, it is also possible for oncoming vehicles, vehicles ahead or turning vehicles to be detected by means of a camera and appropriate image recognition software. Such equipment may be provided anyway, for example in order to use a license plate to ascertain data for setup of a connection. This implementation can be used to effectively prevent messages from being transmitted to a vehicle traveling on the same route for some time.

When a signature of the sending vehicle is transmitted in the header portion of the message, the receiving vehicle replaces the signature with its own signature, and forwards the message to the next intermediate receiver or to the database in accordance with the settings that the message contains about the predetermined minimum number of intermediate receivers. This ensures that the signature of the transmitter forwarding the message to the central database has only a very low statistical probability of being concordant with the signature of the actual source. The signature of the vehicle can be programmed in when the vehicle is delivered or licensed, for example. It is also possible to use the signature of the vehicle that is used for an onboard or online service manual.

According to one aspect of the method according to the invention, the signature is verified by the receiver without the content of the message being opened. The message is then forwarded only if the signature has been verified successfully. Methods known from pay-TV technology can be used to block signatures that have been detected as unreliable data sources. A list of blocked signatures can be transmitted to the vehicles and kept up to date by means of wireless transmission, for example. In this regard, a regional selection of signatures may be provided that is transmitted to other vehicles, which means that the number of signatures to be blocked that need to be transmitted can be reduced. In particular signatures frequently associated with route data messages that relate to a particular region, are incorrect or unreliable can thus be effectively blocked.

For data transmission between two vehicles, an ad-hoc point-to-point connection can be used, for example based on the IEEE 802.11 P standard. Forwarding to the vehicle-external database can be effected via known wireless connections, for example based on the GSM (Global System for Mobile communications), UMTS (Universal Mobile Telecommunications System), LTE (Long Term Evolution), or other suitable connections.

If, in addition to encryption of the user data area of the message, there is provision for encryption of the header, then this can be effected in accordance with the known "public-private key" method using a public key of the intermediate receiver. The intermediate receiver decrypts the header using its private key and processes and forwards the message in accordance with the invention. Encryption of the header too can hamper eavesdropping by third parties further.

If multiple intermediate receivers forward a route data message before it is sent to the database, the number of intermediate receivers or "hops" can be used to ascertain a trust value in the database. This is based on a larger number of hops being consistent with a correspondingly greater probability of the message possibly having been altered on its way from data capture to the database. This results in a lower trust value. Also, a message is probably also no longer very relevant after a larger number of hops. Depending on the message content, the number of hops can thus influence the further processing in the database.

It is easy to see that features of the different aspects of the method according to the invention that are described above can be combined. For example, there may be provision for route data messages to be forwarded to an intermediate receiver only after a waiting time has elapsed after capture and/or after a radius around the capture location has been left. However, it is fundamentally possible to transmit route data messages to an intermediate receiver immediately after capture of the route data. In this case, the predetermined radius is zero and the time interval has a duration so short that the randomly chosen time in the time interval is consistent with immediate sending. The different variants of the encryption can also be used either for direct transmission of the route data messages to the database or for transmission via intermediate receivers.

An apparatus set up for performing one or more aspects of the method according to the invention comprises one or more sensors for capturing the route properties, an apparatus for determining a capture location, e.g. a satellite-assisted and/or map-based navigation system, and one or more communication interfaces for wireless communication with vehicle-external transmitters and receivers communicatively connected to a controller. The controller comprises one or more microprocessors effecting read or write access to volatile and nonvolatile memories. The nonvolatile memory contains program instructions that, when executed by the one or more microprocessors in the volatile memory, perform method steps for controlling the one or more sensors, the apparatus for determining the capture location and the communication interfaces in accordance with one or more aspects of the method according to the invention.

The delay in the transmission hampers creation of an exact driving profile, and the last transmission cannot be used to infer an exact current location of the vehicle. It is merely possible to establish with certainty that the vehicle has at some time been at the capture location within a time interval that is unknown to a third party. This holds in particular for data that are independent of a direction of travel, that is to say temperature and precipitation, for example, but also a gradient or a slope of a road. In the case of route properties that facilitate a reconstruction of a direction of travel, said reconstruction is hampered in accordance with other instances of the aspects described above, e.g. by a lengthy delay, which increases the probability of multiple journeys within the delay period, or by a transmission to the database only after multiple journeys have been made. The disengagement of route data from the capturing vehicle as a result of transmission via one or more other vehicles acting as message transmitter further hampers the creation of a driving profile for a vehicle. In this case, it is not even possible to establish with certainty that the sending vehicle was actually once at or close to the capture location.

BRIEF DESCRIPTION OF THE DRAWINGS

Aspects of the invention will be described below with reference to the drawing. In the drawing.

DETAILED DESCRIPTION

In the figures, identical or similar elements are provided with identical reference signs.

Figure 1:
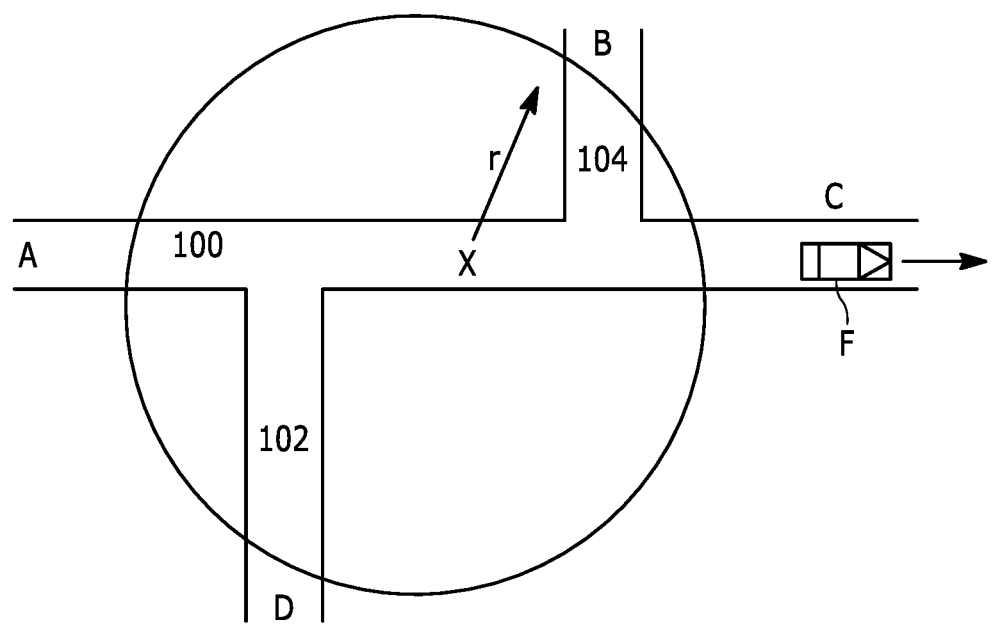
FIG. 1 shows a schematic example of a first aspect of the method according to the invention.

FIG. 1 shows a schematic example of a first aspect of the method according to the invention. The figure shows a road 100 having a first and a second junction, 102 and 104. A vehicle F travels from left to right on the road 100, indicated by the arrow in front of the vehicle F. At the position x, the vehicle captures a property of the route, that is to say of the lane on the road 100 on which the vehicle F is traveling. According to the invention, the route property and the location of capture are not immediately sent to a database, not shown in the figure, in a route message. Rather, the location x of capture is a center for a radius r that the vehicle F first needs to leave before the route message can be sent. The transmission is thus effected at some position outside the radius r. In the example from FIG. 1, the route message cannot be used to infer where the vehicle F is at present, because the radius r has been chosen such that it covers branching-off roads. If a transmission shortly after the radius r has been left is assumed, the vehicle F could be at four different positions A, B, C, D at the time of the transmission.

Figure 2:
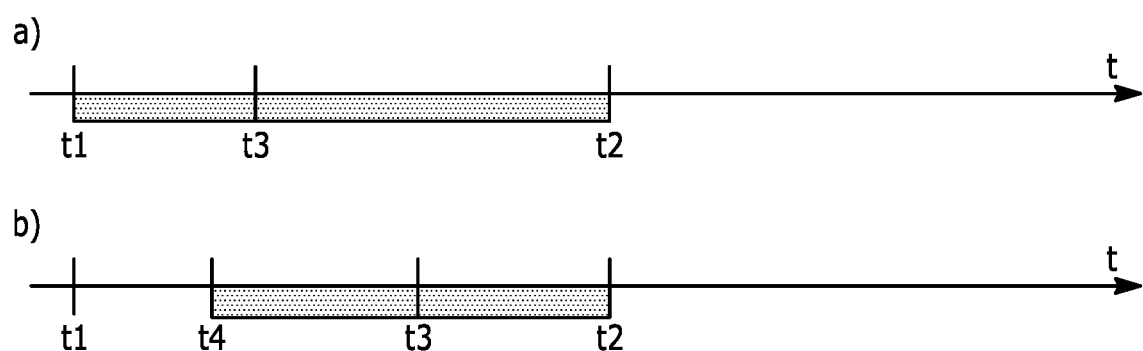
FIG. 2 shows a schematic depiction of a second aspect of the method according to the invention.

FIG. 2 shows a schematic depiction of a second aspect of the method according to the invention, in which a transmission to a database is dependent not on a distance from the capture location, but rather on a time that has elapsed since the capture. In FIG. 2a), a route property is captured at the time t1. The time t1 simultaneously marks the start of a time interval extending to the time t2, within which the transmission is effected at a randomly selected time t3. The selection of the time t3 for the transmission can also be rendered dependent on further parameters, for example on a speed of travel, on a number of captured route properties for a section of an itinerary or for a period, or the like. In FIG. 2b), the time interval running to the time t2, within which the transmission is effected, begins not immediately the route property is captured at the time t1, but rather at a later time t4. The time t4 may be at a stipulated interval of time from the time t1. As fundamentally for other aspects of the method according to the invention, the interval may also be dependent on further parameters, e.g. on the arrival at a distance from the capture location, on a density of roads within a radius around the capture location, on an average speed of travel before and/or after the capture, or the like. The density of roads can be established easily using a combination of position determination and matching against a map indicating whether the vehicle is inside or outside a town. It is also possible to have the period for transmission begin after a distance or time condition has been satisfied, depending on which condition is satisfied first. Alternatively, the period can begin on capture, but the transmission is not effected until the radius around the capture location has been left, or, if the radius has not been left in time, at the end of the period. As described above with reference to FIG. 2a), the transmission is effected at a time t3 selected at random or according to a rule within the time interval t4-t2.

Figure 3:
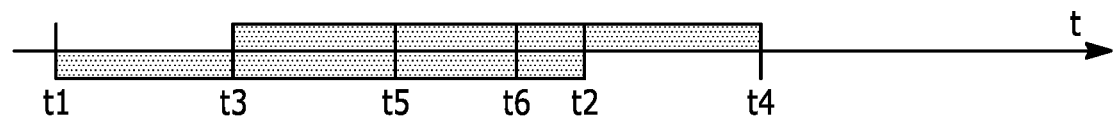
FIG. 3 shows a schematic depiction of a third aspect of the method according to the invention.

FIG. 3 shows a schematic depiction of a third aspect of the method according to the invention that can be used when multiple route properties have been captured in brief succession. At the time t1, a first route property is captured. The time t1 simultaneously marks the start of a time interval t1-t2 within which the first route property is transmitted to the database. At the time t3, a second route property is captured. The time t3 simultaneously marks the start of a time interval t3-t4 within which the second route property is transmitted to the database. Since the time at which the route property is transmitted to the database is selected at random, the second route property can be transmitted before the first route property is transmitted. In this example, the second route property is transmitted at the time t5, and the first route property at the time t6. This example accordingly also shows the order of transmission to the database, which is independent of the order of capture. The order of the transmissions, which is independent of the chronological order of the captures, can at least hamper the reconstruction of a direction of travel for a single journey, depending on the type of route properties and the number of transmissions.

Figure 4:
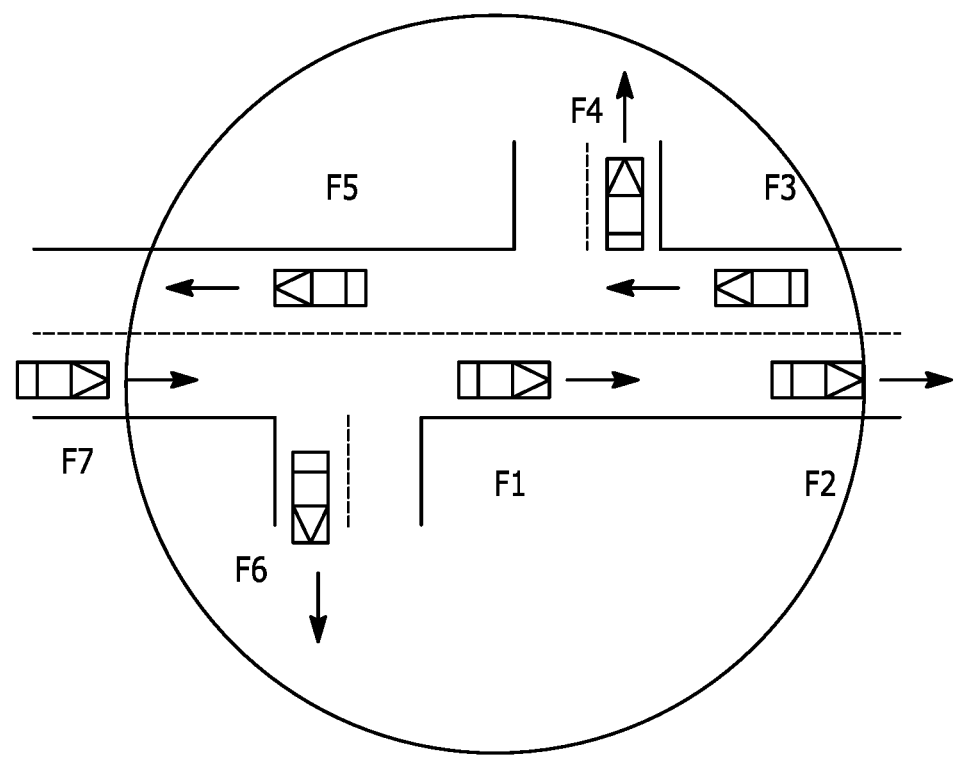
FIG. 4 shows a schematic depiction of a fourth aspect of the method according to the invention.

FIG. 4 shows a schematic depiction of a fourth aspect of the method according to the invention. In the case of this aspect, a transmission to the database is effected not directly by the vehicle that has captured the route property, but rather via one or more intermediate receivers. Multiple vehicles F1-F7 are traveling on a first road 100 and on roads 102 and 104 branching off from the first road 100. The first vehicle F1 has captured a route property at its current position. Since a direct transmission to the database is impossible according to the invention, a message having the route properties must first of all be sent to another vehicle in communication range. In the example shown in the figure, the vehicles F2 to F6 are in communication range of vehicle F1, indicated by the circle centered around the vehicle F1.

Figure 5:
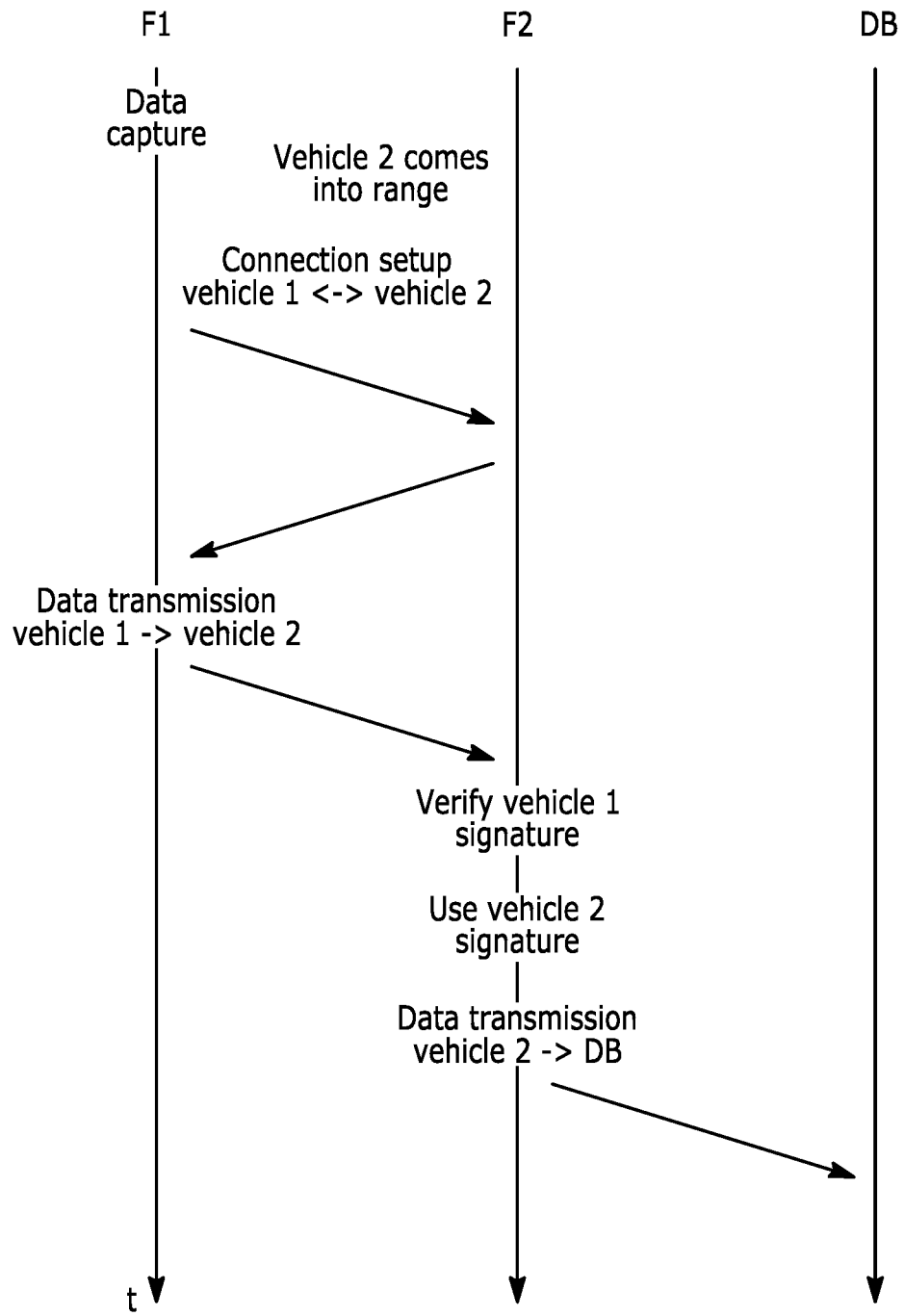
FIG. 5 shows a schematic sequence of the transmission of messages having route properties in accordance with the fourth aspect of the method according to the invention.

FIG. 5 shows a schematic sequence of the transmission of messages having route properties in accordance with the fourth aspect of the method according to the invention already presented with reference to FIG. 4. A first vehicle F1 captures route data, and stores them in a vehicle-internal memory. At a later time, a second vehicle F2 comes into communication range of the first vehicle F1. If any conditions to be observed for the sending of the data are satisfied, that is to say, by way of example, a radius around the capture location has been left, or data that need to be transmitted particularly urgently are available, the first vehicle F1 initiates setup of a connection to the second vehicle F2 by sending a connection request. If the second vehicle responds positively to the connection request, then further steps for preparing to transmit the data can follow. During setup of the connection, it is possible for not only information required for setting up a transmission channel but also further information to be transmitted, which is used to decide whether route data can be transmitted to the second vehicle. As such, by way of example, a direction of travel of the second vehicle F2 can be taken into consideration, or whether the second vehicle has already served as an intermediate receiver for a transmission by the first vehicle, and a waiting time conditional thereon has not yet elapsed. If route data can be transmitted to the second vehicle, the first vehicle sends them with its signature. The second vehicle verifies the signature and replaces it with its own signature if the result of the verification is positive. The second vehicle then transmits the route data to the database or to a further intermediate receiver, possibly after further conditions to be taken into consideration before the transmission to the database have been satisfied.

Figure 6:
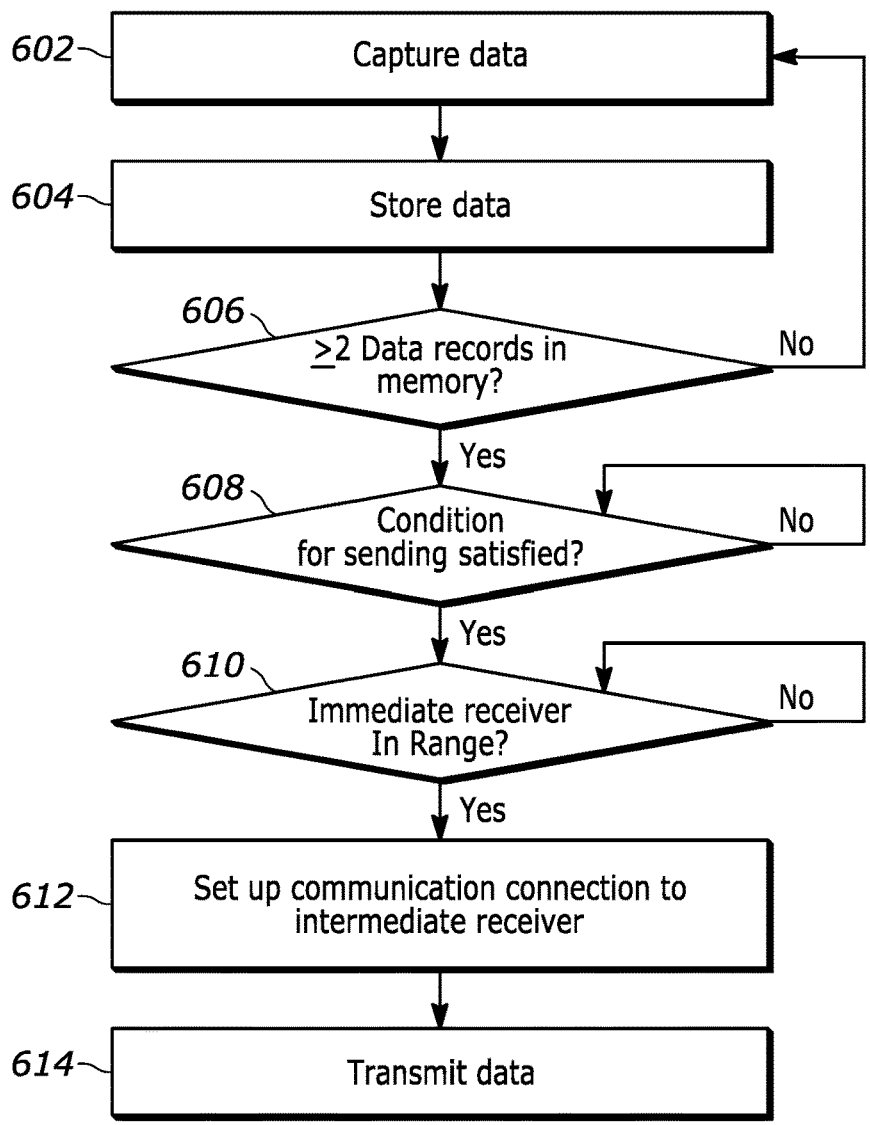
FIG. 6 shows an exemplary schematic flowchart of an aspect of the method according to the invention.

FIG. 6 shows an exemplary schematic flowchart of an aspect of the method according to the invention. In step 602, a vehicle, not depicted in the figure, captures route data, and stores them in a vehicle-internal memory in step 604. In step 606, a check is performed to determine whether there are more than two data records in the vehicle-internal memory. If not, "no" branch from step 606, further data are captured and stored. If there are, "yes" branch from step 606, a check is performed in step 608 to determine whether further pre-conditions are satisfied that are necessary for sending. If not, "no" branch from step 608, sending is delayed until the conditions are satisfied. If the conditions are satisfied, "yes" branch from step 608, a check is performed in step 610 to determine whether an intermediate receiver is in communication range. The check is performed until an intermediate receiver is in communication range. If another vehicle is in communication range that can serve as an intermediate receiver, "yes" branch from step 610, a communication connection is set up in step 612, and the data are transmitted in step 614. It should be pointed out that the flowchart shown in FIG. 6 reproduces the sequence of the method only by way of example. Certain parts of the method can proceed in parallel, and also be called again by a subsequent step in the flowchart. As such, by way of example, new data can be captured and stored while, in another subarea of the method, a check is performed to determine whether necessary conditions for transmission are satisfied, and the presence of the conditions for a transmission can be inspected again if an intermediate receiver is in communication range.

Figure 7:
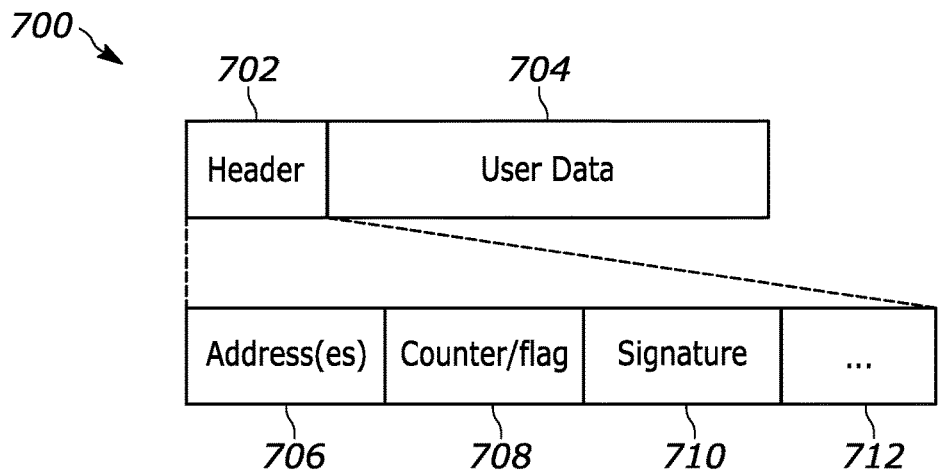
FIG. 7 shows an exemplary structure of a route data message according to one or more aspects of the method according to the invention.

FIG. 7 shows an exemplary structure of a route data message 700 for use according to one or more aspects of the method according to the invention. The route data message is split into a header area 702 and a user data area 704. The header area is further split into an address area 706, a counter area 708 and a signature area 710. One or more further areas 712 for further data, the arrangement of which in the header area 702 is advantageous, may additionally be provided. The address area 706 can be used to transmit the origin and/or destination address of the data packet. Moreover, an address of the intermediate receiver can be transmitted at this point. Some of the addresses, in particular those allowing the message to be explicitly linked to a vehicle that has captured the user data of the message, can be changed by the intermediate receiver. The counter area 708 can transmit a count indicating via how many intermediate receivers the message still needs to be sent before it can be sent to the database, and/or an absolute time after which, when said time is reached, the message can be sent to the database. The signature area 710 contains a signature of the transmitter, which is inspected by the receiver before the message is forwarded. The address of the transmitter can also be used for the inspection. In the event of successful inspection and a positive result, the intermediate receiver replaces the signature and possibly the sender address with its own signature and address before the message is forwarded. The arrangement of the addresses, of the counter and of the signature in the header area 702 of the route data message allows the user data to be encrypted using a public key of the database, so that the actual content of the route data message cannot be decrypted until after reception in the database. This permits the route data to be differentiated, e.g. according to the manufacturer of the vehicle that has captured the data. As such, by way of example, a vehicle from one manufacturer can encrypt the data using a public key of a particular database providing services only for vehicles from this manufacturer, and the data can nevertheless be transmitted to the database via vehicles from any other manufacturers as intermediate receivers.

The invention claimed is:

1. A method for transmitting route data captured by a traveling vehicle to a database arranged separately from the vehicle, comprising:
   capturing one or more route data records, wherein the route data records comprise route data and also a location and a time of capture, and storing the captured route data records in a memory of the vehicle; and
   sending route data messages to the database when the one or more route data records is available in the memory, wherein the route data messages comprise route data and an associated location of capture, the route data messages being sent when the vehicle has left a predetermined radius centered around the location of capture of the route data, the predetermined radius being large enough to encompass one or more road intersections on the route, such that the location of capture of the route data cannot be used to infer a current location of the traveling vehicle.

2. The method as claimed in claim 1, wherein if the one or more route data records is greater than one, route data messages comprising route data and the associated location of capture are sent in a first order.

3. The method as claimed in claim 2, wherein the first order is a random order independent of the chronological order of capture of the one or more route data records.

4. The method as claimed in claim 2, wherein two successive transmissions of route data messages are effected at a randomly selected interval of time.

5. The method as claimed in claim 1, wherein a statement about a period within which the route data records have been captured is transmitted in the route data messages.

6. The method as claimed in claim 1, wherein the radius is determined on the basis of the urgency of the transmission of the route data records, an average speed of travel of the vehicle around the time of the capture or a minimum number of road junctions within the radius, or are adjustable by a user.

7. The method as claimed in claim 1, wherein the route data records and location of capture are transmitted in a user data area of a message, and wherein a header of the message contains a signature of the sending vehicle and an address area having an origin address of the message.

8. The method as claimed in claim 7, wherein the user data area of the message is encrypted using a public key of the database.

9. The method as claimed in claim 7, wherein the message from the capturing vehicle is first of all transmitted to another vehicle, the other vehicle replacing the signature and the origin address of the sending vehicle in the header of the message with its own signature and its own origin address before the message is transmitted to the database.

10. The method as claimed in claim 9, wherein the receiving vehicle validates the signature of the sending vehicle.

11. The method as claimed in claim 9, wherein the message contains a feature identifying it as a forwarded message or as an original message.

\* \* \* \* \*